(12) United States Patent  
Poeschl (10) Patent No.: US 6,584,887 B1
(45) Date of Patent: Jul. 1, 2003

(54) LINEAR MOTOR DEVICE (75) Inventor: Philip M. Poeschl, Roseville, MN (US)

(73) Assignee: Tol-O-Matic, Inc., Hamel, MN (US)

( * ) Notice: Subject to any disclaimer, the term of this patent is extended or adjusted under 35 U.S.C. 154(b) by 0 days.

(21) Appl. No.: 09/204,634

(22) Filed: Dec. 2, 1998

Related U.S. Application Data (60) Provisional application No. 60/106,781, filed on Nov. 3, 1998.

(51) Int. Cl.[7] ............................................. F01B 29/00
(52) U.S. Cl. .................................................. 92/88
(58) Field of Search ...................... 92/88, 137; 277/908

(56) References Cited

U.S. PATENT DOCUMENTS

| | | |
|---|---|---|
| 3,484,944 A | 12/1969 | Pryshlak .................... 33/181 |
| 3,790,233 A | 2/1974 | Polidor ...................... 308/6 R |
| 4,614,382 A | 9/1986 | Teramachi ................... 384/45 |
| 4,769,565 A | 9/1988 | Teramachi ................... 310/12 |
| 4,838,147 A * | 6/1989 | Grishchenko ................... 92/88 |
| 5,275,088 A * | 1/1994 | Takada et al. ................. 92/88 |
| 5,374,128 A | 12/1994 | Herbeck ....................... 384/49 |
| 5,555,789 A | 9/1996 | Rosengren et al. ......... 92/165 R |
| 5,653,314 A * | 8/1997 | Yamamoto et al. ......... 92/88 X |

* cited by examiner

Primary Examiner—Hoang Nguyen
(74) Attorney, Agent, or Firm—Dorsey & Whitney LLP (57) ABSTRACT

A linear motion device having an elongated body a carriage moveable in a linear path relative to the body and a bearing positioned between the carriage and body for supporting the carriage for movement along the linear path. The device further includes a wedge member in the body for adjusting the position of the bearing.

20 Claims, 5 Drawing Sheets

LINEAR MOTOR DEVICE

This application claims benefit of Provisional Application No. 60/106,781 Nov. 3, 1998.

BACKGROUND OF THE INVENTION

1. Field of the Invention

The present invention relates generally to the field of linear motion devices and more particularly to a pneumatic or rodless cylinder having a carriage moveable relative to a body and a bearing means for supporting and guiding reciprocal movement of the carriage relative to the body. More specifically, the present invention relates to a bearing support and adjustment mechanism for a pneumatic or rodless cylinder.

2. Description of the Prior Art

A variety of linear motion devices currently exist in the art. Many are of the type which include a body, a carriage moveable relative to the body and bearing or a support means positioned between the carriage and the body for purposes of supporting and guiding the carriage during movement relative to the body. Pneumatic or rodless cylinders represent one such form of linear motion device. These devices generally include an elongated cylinder body, a piston reciprocally moveable within the cylinder body and a carriage connected to the piston either directly or indirectly for transferring reciprocal movement of the piston to a workpiece. Such devices also include various bearing or other means for supporting and guiding the carriage during its reciprocal movement relative to the cylinder body.

One such means is shown in U.S. Pat. No. 4,724,744 issued to Rosengren in which a pair of integral arms extend outwardly from the carriage and embody a pair of low friction rods for sliding movement relative to a bearing groove in the outer side surfaces of the cylinder. A further guide and support mechanism is illustrated in U.S. Pat. No. 4,878,390 issued to Hauser. Hauser discloses a linear positioning apparatus having a cylinder body, a carriage moveable relative to the body and a bearing means comprising a series of recirculating ball bearings for guiding and supporting the carriage relative to the cylinder body. A still further linear motion device is shown in U.S. Pat. No. 5,555,789 issued to Rosengren et al. which discloses a pair of separate and adjustable side rails for supporting the bearing means.

Regardless of the particular bearing means utilized to support movement of the carriage relative to the body, the selection and design of such bearing means necessarily involves the consideration of several factors including the nature of the cylinder body, the method by which such body is manufactured, the reaction of the body to dynamic forces during operation, the tolerances achievable with a certain cylinder body design, and the tolerances needed for a particular bearing design.

Pneumatic or rodless cylinders of the type to which the present invention has particular application, commonly embody cylinder bodies which are relatively long compared to the carriage dimensions. It is not uncommon for such cylinder bodies to be 20 feet long or longer. This makes it extremely difficult to maintain close tolerances along the entire body length. Further, most of these elongated bodies for these pneumatic cylinders are extruded rather than machined. This further compounds the problem of maintaining close tolerances. Still further, pressures within the cylinder which drive the piston cause the cylinder to repeatedly expand and contract during reciprocal movement of the piston, thus presenting further problems with respect to establishing and maintaining tolerances.

Accordingly, there is a need in the art for a linear motion device and more particularly for a pneumatic or rodless cylinder device having an improved bearing support structure which minimizes the need to maintain close tolerances during manufacture of the component parts, but which still facilitates easy assembly of the device with the desired close tolerances.

SUMMARY OF THE INVENTION

In contrast to the prior art, the present invention provides for a linear motion device having an improved bearing support and/or adjustment structure which facilitates manufacture of such device, including its component parts, with significantly greater flexibility with respect to maintaining tolerances, but which still results in a device having relatively close tolerances. More specifically, the preferred structure of the present invention includes an elongated cylinder body, a reciprocally moveable piston within the cylinder and a carriage mounted to the piston for reciprocal movement therewith. An improved linear bearing means is provided between the carriage and the cylinder or side rail for supporting and guiding the carriage relative to the cylinder during relative movement therebetween. In the preferred embodiment, the bearing means includes an elongated bearing member and a bearing support and adjustment means. The bearing support and adjustment means includes an elongated side rail with a first wedge surface and a wedge member with a second wedge surface. When assembled, the first and second wedge surfaces engage on another and means in the form of set screws or other threaded members are provided to move the wedge surfaces relative to one another. This in turn provides a means for adjusting the position of the bearing member along the length of the linear motion device. This structure enables the elongated cylinder body and the elongated side rail to be manufactured with a significantly greater degree of tolerance, but which, when assembled, results in a device with desired close tolerances. This in turn significantly reduces manufacturing costs and facilitates use of bearing mechanisms which would otherwise be impractical because of tolerance requirements.

Accordingly, it is an object of the present invention to provide a linear motion device having an improved bearing means for supporting and guiding a carriage for reciprocal, linear movement relative to a body member.

Another object of the present invention is to provide an improved pneumatic or rodless cylinder having a reciprocally moveable piston and a carriage mounted thereto together with an improved linear bearing support mechanism.

A still further object of the present invention is to provide an improved bearing system for a linear motion device including an improved bearing means facilitating greater manufacturing tolerances.

A still further object of the present invention is to provide a an improved mechanism for supporting and adjusting a bearing member in a linear motion device.

A still further object of the present intention is to provide a method of supporting and adjusting a bearing member in a linear motion device.

These and other objects of the present invention will become apparent with reference to the drawings, the description of the preferred embodiment and the appended claims.

DESCRIPTION OF THE DRAWINGS

FIG. 2 is comprised of FIGS. 2a and 2b, and is an exploded, isometric view of the linear motion device of the present invention.

DESCRIPTION OF THE PREFERRED EMBODIMENT

In the following description, references to the terms right and left, top and bottom, upper and lower, and horizontal and vertical are to be read and understood with their conventional meanings and with reference to viewing the present invention as it is shown in the drawings.

Figures 1, 6:
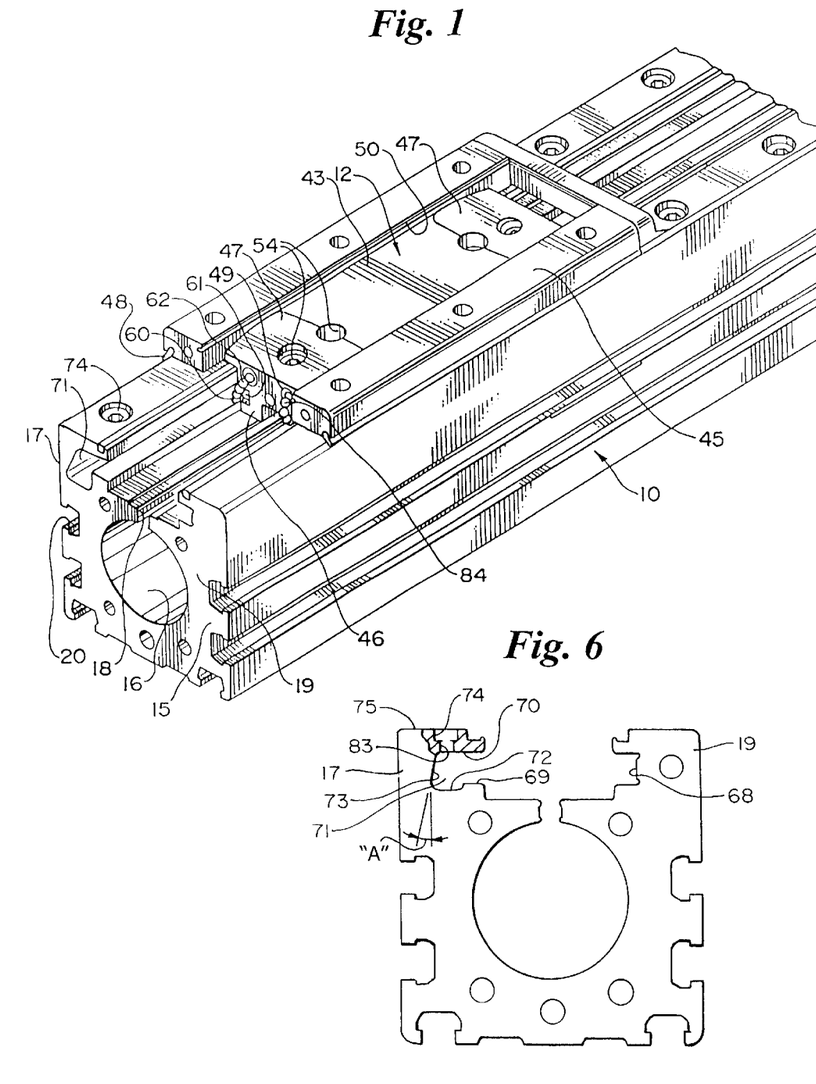
FIG. 1 is an isometric view of a portion of the linear motion device of the present invention, with portions removed and broken away, showing the carriage mounted to the cylinder body.
FIG. 6 is an end view, partially in section, of configuration of the cylinder.
Figure 2A:
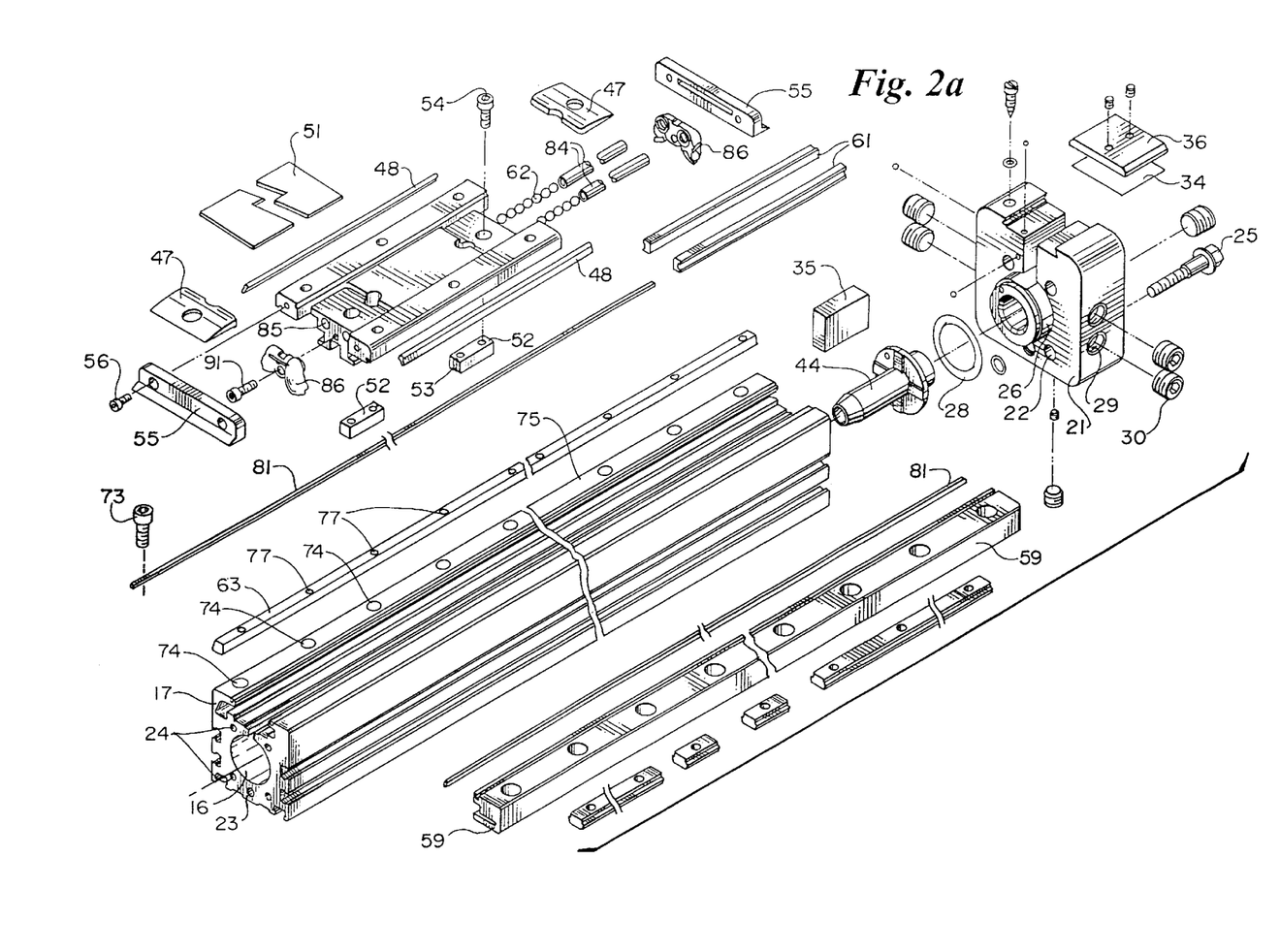
Figure 2B:
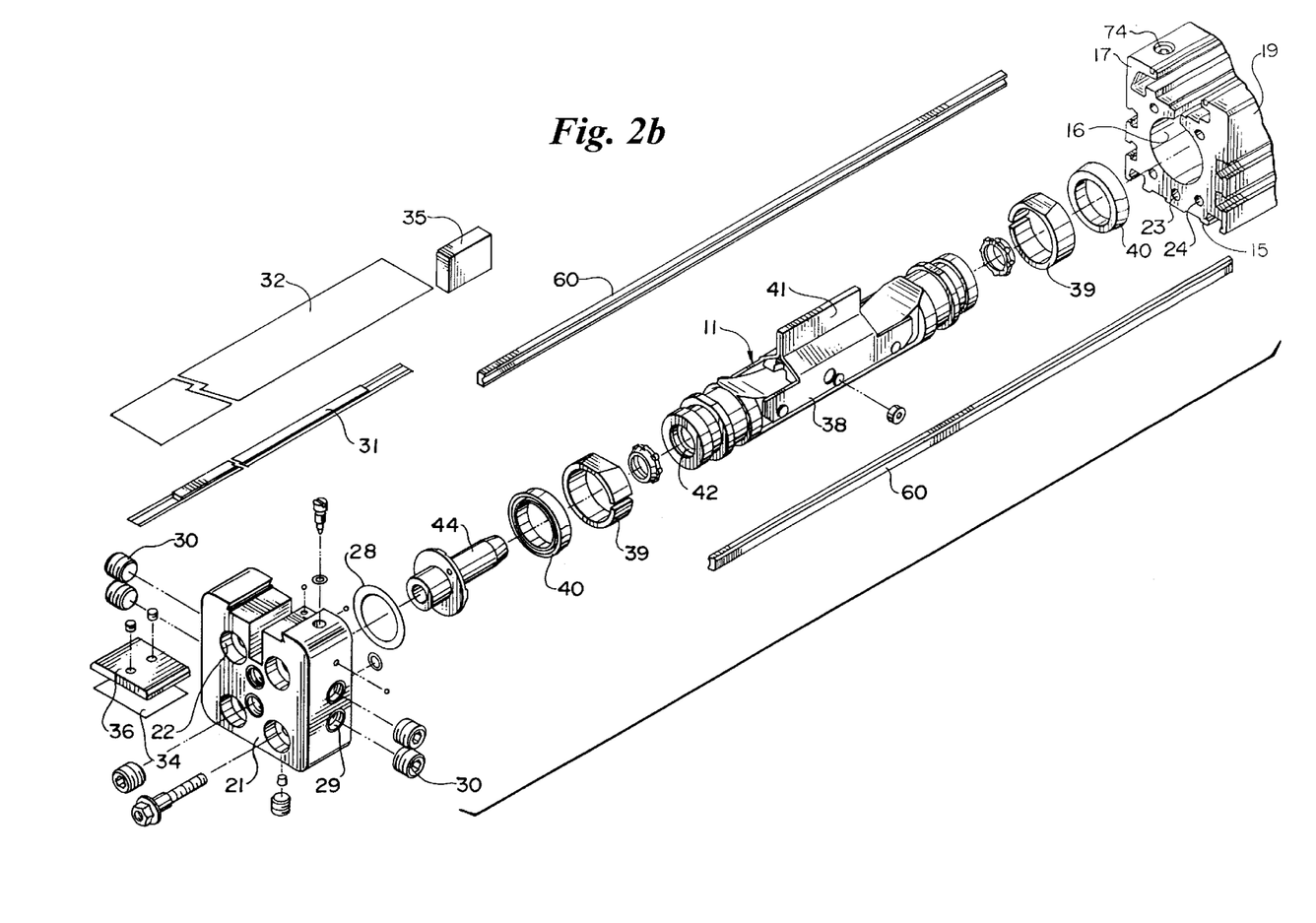

Reference is first made to FIG. 1 showing an isometric view of a portion of the linear motion device of the present invention and FIG. 2, comprised of FIGS. 2a and 2b, showing an isometric exploded view of the entire device. The present invention relates generally to a linear motion device of the type having an elongated body, a carriage movable relative to the body, and a bearing means for guiding and supporting the carriage during movement relative to the body. In the preferred embodiment, the linear motion device is a pressure cylinder device commonly referred to in the art as a pneumatic or rodless cylinder. The pneumatic cylinder of the present invention includes an elongated cylinder assembly 10, a piston assembly 11 reciprocally moveable within the cylinder 10 and a carriage assembly 12 connected with the piston 11 and moveable therewith. A bearing means 14 (FIG. 1) is positioned between the carriage 12 and the cylinder 10 for guiding and supporting the carriage 12 during movement relative to the cylinder.

Figure 3:
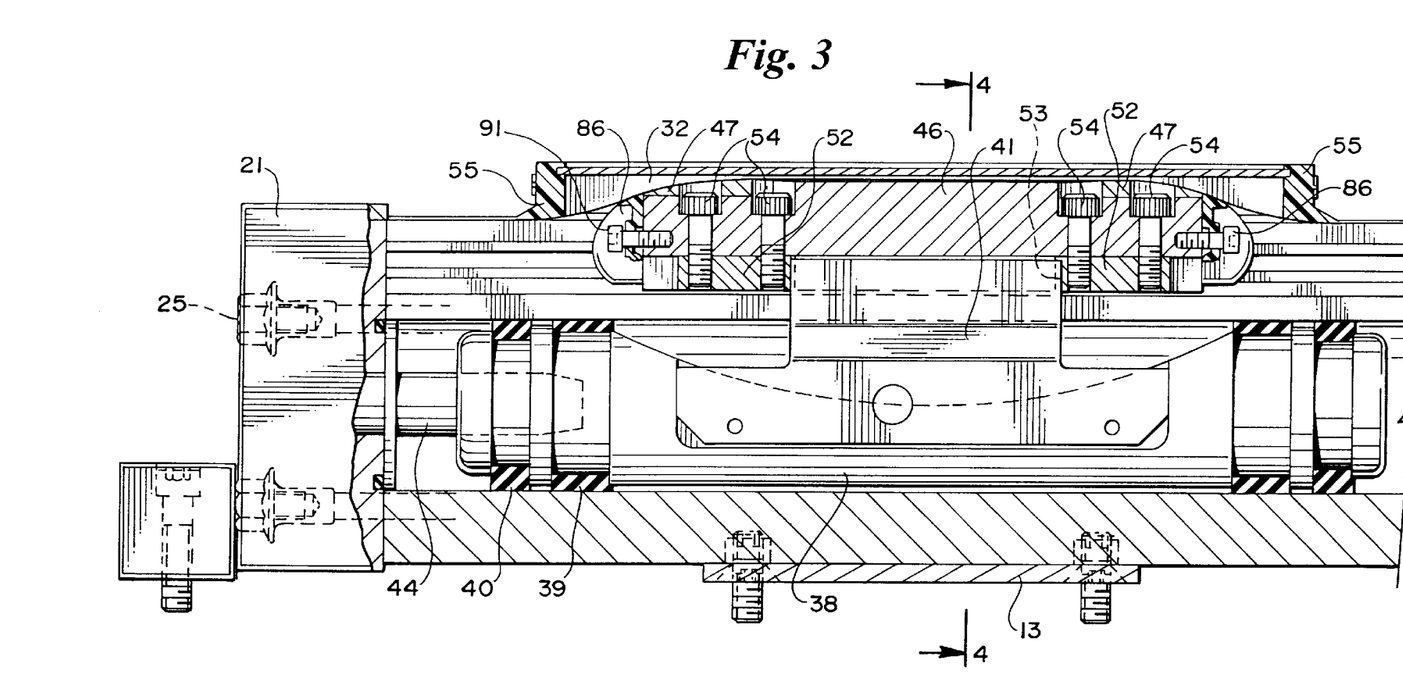
FIG. 3 is a side elevational view with portions broken away and partially in section showing the piston, the carriage and a portion of the cylinder body.
Figure 4:
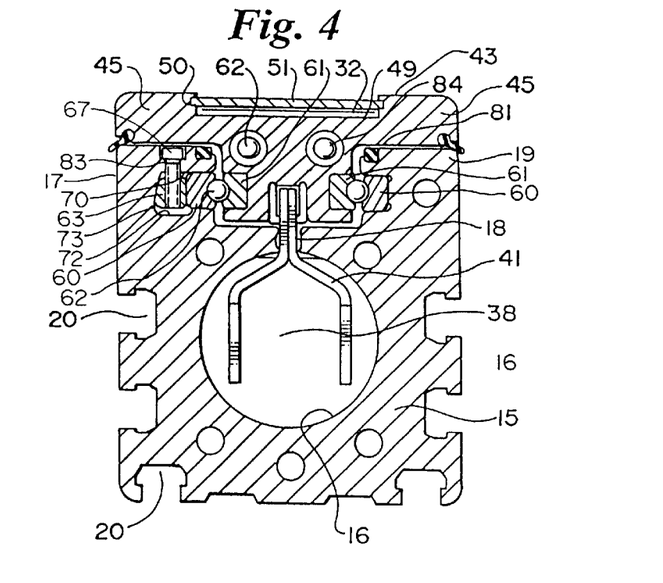
FIG. 4 is a view, partially in section, as viewed along the section line 4—4 of FIG. 3.

More specifically, as illustrated best in FIGS. 1, 2 and 4, the cylinder assembly 10 includes an elongated cylinder or cylinder body 15 having an inner bore 16 extending throughout the entire length of the cylinder along its longitudinal axis. In the preferred embodiment, the bore 16 is cylindrical, although it could be oval, square or a variety of other shapes as well. The cylinder 15 includes a pair of outer side walls and an outer bottom wall. A pair of integral side rails 17 and 19 are provided at the top of the cylinder along its outer edges. An elongated slot 18 is formed between the side rails 17 and 19 and between the top wall of the cylinder 15 and the bore 16. In some cylinder embodiments, such as embodiments where the piston and carriage are magnetically coupled, the slot can be eliminated. The side rails 17 and 19 and the slot 18 extend the entire length of the cylinder 15. A plurality of mounting or accessory connection channels 20 are also formed in the side and bottom walls for mounting the cylinder 15 to a base 13 (FIG. 3) or other support member or for connecting accessory elements to the cylinder 15. In the preferred embodiment, the cylinder is extruded and is constructed of a lightweight metal such as aluminum.

An end cap or head assembly 21 (FIG. 2) is connected to each end of the cylinder body 15. Each end cap 21 is provided with a plurality of openings 22 which are generally aligned with corresponding threaded openings 24 in the ends of the cylinder 15. A like number of threaded members 25 extend through the openings 22 for threaded connection with the openings 24 to secure the end cap 21 to the body 15. Each end cap 21 further includes an inwardly extending portion 26 for insertion into the cylindrical bore 16. A peripheral surface of each of these portions 26 is provided with an o-ring or other sealing member 28. The O-ring 28 engages the inner surface of the bore 16 to provide a seal between the end cap 21 and the cylinder 15. Each end cap 21 is also provided with a plurality of ports 29 which are either plugged by corresponding plugs 30 or are connected with a source of pneumatic pressure. When selected ports are connected with a source of pneumatic pressure, the pressure can be selectively directed to pressure chambers within the cylinder 15 on opposite sides of the piston 11. Pressure to such chambers can be supplied from both ends of the cylinder 15 or selectively from one end via the port 23 which extends from one end of the cylinder to the other. Means are also provided for successively sealing the cylinder slot 18 and for providing a dust cover over the bearing means 14 during reciprocal movement of the piston 11 and carriage 12. In the preferred embodiment, the slot sealing means is comprised of the elongated seal member 31, while the dust cover is comprised of a relatively flat and thin steel dust band 32. These elements are secured to each of the end caps 21 by the connection members 34, 35 and 36. The actual construction of members such as the seal 31 and the dust band 32 and their connection to the end caps is well-known in the art.

The piston assembly 11 is adapted for reciprocal movement within the cylindrical bore 16 and includes a main piston body 38 comprised of a centrally located portion and a pair of opposite ends. Each end of the piston body 38 is provided with a wear ring 39 for maintaining the piston in a centered position within the bore 16 and a seal member 40 for sealing engagement with the inner surface of the cylinder bore 16. The seals 40, together with the end caps 21, define the ends of the pressure chambers on opposite ends of the piston 11. By selectively introducing pressure into these chambers, the piston 11 can be reciprocally moved along the cylinder body 15.

As illustrated best in FIGS. 3 and 4 and as will be described in greater detail below, a piston bracket 41 is connected with the central portion of the piston body 38 and extends upwardly through the slot 18 for connection with the carriage 12. The piston body 38 further includes ramp and guide portions for guiding movement of the seal member 31 into and out of sealing engagement with the slot 18 during reciprocal movement along the cylinder. Such structure is known in the art. Each of the piston ends is provided with an opening 42 for engagement with a cushion plug 44 to cushion the stopping of the piston at each end of the cylinder. The plugs 44 are mounted to the end caps 21 and function in a manner known in the art.

With continuing reference to FIGS. 1–4, the carriage assembly 12 comprises a carriage or carrier body 43 having a generally T-shaped cross-sectional configuration, a central portion 46 and a pair of outwardly extending side edge portions 45. Each of the side edge portions 45 is provided with an elongated recess for receiving an elongated flexible seal member 48. As shown best in FIG. 4, a distal edge of the seal members 48 engages a top surface of the side rails 17 and 19 to keep dust and other contaminants from the bearings associated with the carriage 12. The top central portion of the carrier body 43 includes a recessed section 49 for receiving the dust band 32. A pair of wedge shaped upper band ramps 47 are provided on opposite ends of the recessed section 49 to assist in guiding the dust band 32 through the carriage. A retaining slot 50 is provided on each side of the recess 49 for retaining a plastic cover 51. During operation, the dust band 32 is positioned within the area defined by the recess 49 and the cover 51.

As illustrated best in FIGS. 3 and 4, the carrier body 43 is connected with the piston bracket 41 via a pair of connection lugs 52 secured to the central portion 46 of the carrier body 43 by the threaded members 54. The lugs 52 are positioned on opposite ends of the bracket 41 so as to capture the bracket 41, thus resulting in movement of the carriage 12 with the piston 11. As shown best in FIG. 2a, each of the lugs 52 is provided with an alignment slot 53 for maintaining the piston 11 in proper orientation and to prevent its rotation within the bore 16 during reciprocal movement. An end cap or strip 55 is connected with each end of the carriage 12 by a pair of threaded screws 56. As illustrated best in FIG. 3, each of the end caps 55 includes a lower wiper edge for wiping engagement with the top surface of the dust band 32 and the side rails 17 and 19 to wipe dust and other impurities from these surfaces and to prevent such materials from exposure to the bearing assembly.

The bearing assembly is positioned between the carriage 12 and the cylinder assembly 10, and more specifically between the side rails 17 and 19, for supporting and guiding reciprocal movement of the carriage 12 relative to the cylinder body 15. In general, the bearing assembly includes a bearing means on each side of the central portion 46 between the carriage assembly 12 and the rails 17 and 19. Each bearing includes a first bearing member in the form of an outer race 60 connected with one of the rails 17 and 19 and a second bearing member in the form of an inner race 61 associated with the carriage for bearing cooperation relative the outer race 60. In the preferred embodiment, the linear bearing means further includes a plurality of recirculating ball bearings 62 following an endless path between the inner and outer races 61 and 60 and through bearing openings in the carriage 12.

The main body of the carriage 12 is manufactured via an extrusion process from a light-weight metal such as aluminum. Each side surface of the central portion 46 of the carriage 12 is provided with an extruded race receiving recess 64 having a C-shaped cross-sectional configuration for receiving the inner bearing race 61. The recesses 64 are dimensioned to permit the inner race members 61 to be retained within the recesses 64 by a pressfit. In the preferred embodiment, each inner race 61 is constructed of a hardened metal such as steel or the like and includes a ball bearing receiving groove 65. Preferably the recesses 64 are provided with an inwardly extending lip at its outer edge for assistance in retaining the races 61 within the recesses 64. Each of the inner race members 61 extends the entire length of the carrier body 43.

As shown best in FIGS. 4 and 6, the side rail 19 includes a bearing receiving recess 68 for receiving the outer race member 60 of one of the bearings. The recess 68 extends the entire length of the side rail 19 and has a generally C-shaped cross sectional configuration with top and bottom walls, a back wall and an open front to receive the race 60.

Figure 5:
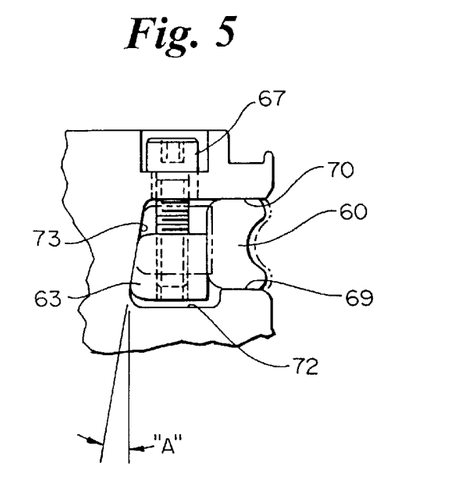
FIG. 5 is an enlarged view showing the relationship between the side rail and the wedge.
Figure 7:
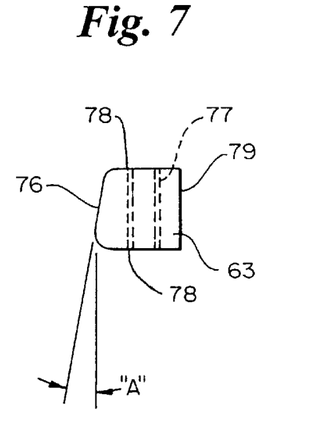
FIG. 7 is an end view showing the cross-sectional configuration of the wedge.

The rail 17 includes a race receiving area between the race receiving surfaces 69 and 70 and a wedge receiving area 71 defined by the surfaces 70, 72 and 73. As shown, the race receiving surfaces 69 and 70 are generally parallel to one another and function to receive an elongated outer race 60 (FIGS. 4 and 5) in a tight fitting, press fit relationship. The surfaces 72 and 70 of the wedge receiving area 71 are also preferably parallel to one another. That portion of the surface 70 which defines a portion of the wedge receiving area 71 is an extension of the surface 70 which defines the race receiving area. The surface 72 is off set from the surface 69 as shown so that the distance between the surfaces 70 and 72 is greater than the distance between the surfaces 70 and 69. The surface 73 of the wedge receiving area 71 is a surface which is not perpendicular to the surfaces 70 and 72, but rather is beveled as shown to provide a first wedge or beveled surface. Each of the surfaces 69, 70, 72 and 73 extend the entire length of the cylinder. Positioned along the length of the rail 17 are a plurality of shouldered screw receiving openings comprised of a head opening 74 and a shank opening 83 to receive the shank. The combination of the openings 74 and 83 extends from the top outer surface 75 of the side rail 17 and into the interior of the wedge receiving area 71 as shown. Preferably, these holes are positioned inch or two along the entire length of the cylinder, with the preferred spacing being about 1½ inches. Shorter or longer spacing can, however, be provided if desired.

Designed for insertion into the wedge receiving area 71 is an elongated bearing wedge 63 illustrated best in FIGS. 2a, 4, 5 and 7. The bearing wedge 63 includes top and bottom surfaces 78,78 which are preferable parallel to one another and which face surfaces 70 and 72 of the wedge receiving area 71 when assembled. An inner surface 79 of the wedge 63 is at generally right angles to the surfaces 78, and when assembled, engages the outer surface of the outer race 60. The outer surface of the wedge 63 is beveled relative to the surfaces 78 and thus is not perpendicular to the surfaces 78. This beveled surface 76 forms a second wedge surface which, when assembled, is designed for engagement with the first wedge or beveled surface 73 of the rail 17. In the preferred embodiment, when assembled, the surfaces 78 are parallel to the surfaces 70 and 72, the surface 79 is parallel to the outer surface of the race 60 and the beveled or wedge surfaces 76 and 73 are parallel to one another.

The wedge member 63 includes a plurality of spaced threaded openings 77 to receive a plurality of screws or threaded members 67. When assembled, the screws 67 extend through the openings 74 and 83, into the wedge receiving area 71 and into the threaded openings 77. When so connected, rotation of the screws 67 causes corresponding vertical movement of the wedge 63 within the rail 17. Vertical movement of the wedge 63, in turn, causes the wedge 63 to move laterally relative to the cylinder body as a result of sliding engagement between the wedge surfaces 73 and 76. To accommodate this lateral movement of the wedge 63, it is necessary for the screw openings 74 and 83 to be larger than their corresponding head and shank portions of the screw 67.

It is contemplated that the angle at which the surfaces 73 and 76 are beveled relative to the vertical can vary depending on the desired adjustment. Preferably, it is intended that the angle of these beveled surfaces should be between 5 and 15 degrees, more preferably about 8 and 12 degrees, and most preferably about 10 degrees.

Having described the structure of the bearing support and adjustment means, operation of such means and the method aspect of the present invention can be understood and described as follows. First, after having mounted the outed race 60 into the side rail 19, the wedge 63 is positioned in the wedge receiving area 71 and the threaded members 67 are inserted through the openings 74 and into the threaded holes 77 in the wedge 63. When in this position, the screws 67 are maintained in a relatively loose position so that the wedge 63 is near the bottom of the area 71. The ballway or race 60 for the slide rail 17 is then pressed into the rail 17 between the surfaces 69 and 70. During this insertion, the race 60 is pressed into the rail against the wedge 63. The carriage 12 and the ball bearings are then loaded into place. Finally, the adjustment screws 67 are tightened. This pulls upwardly on the wedge 63 causing the wedge to move vertically upwardly with the beveled surfaces 73 and 76 sliding relative to one another. This, in turn, causes the wedge to move toward the right as viewed in FIG. 4 and causes corresponding movement of the outer race 60 toward the inner race 61 on the carrier. Such movement takes up any clearance between the races 60 and 61. Thus, the wedge assembly provides an accurate adjustment mechanism for adjusting the position of the outer race 60 in the rail 17, either to adjust it relative to an installed carriage or to preload the cylinder by means of a strain gauge or the like.

Although the description of the preferred embodiment has been quite specific, it is contemplated that various modifications could be made without deviating from the spirit of the present invention. For example, the preferred embodiment shows the rails 17 and 19 as being integrally formed with the cylinder body. One or both of such rails could be separate elements and rigidly connected with the cylinder body by threaded members or other means. Further, the preferred embodiment shows only one of the rails 17 and 19 provided with a wedge member. It is contemplated that both could be. Still further, the preferred embodiment discloses one of the wedge surfaces as being a portion of the rail 17, with the other wedge surface being carried by the wedge 63. It is contemplated that, if desired, the outer face of the race 60 adjacent to the wedge 60 could also be provided with a beveled or wedge surface, with a corresponding beveled or wedge surface on the adjacent surface of the wedge 63. In such a construction, the surfaces 73 and 76 would be perpendicular to the surfaces 70 and 72. In general, any combination of surfaces among the rail 17, the wedge 63 and the adjacent outer race 60 may be provided with wedge surfaces as long as generally vertical movement of the wedge results in corresponding lateral movement of the race 60.

Accordingly, it is intended that the scope of the present invention be dictated by the appended claims rather than by the description of the preferred embodiment.

What is claimed is:

1. A linear motion device comprising:
   an elongated body having a body surface portion;
   a carriage moveable in a linear path relative to said body;
   a wedge member adjacent to said body surface portion, said wedge member having a first side surface adjacent to said body surface portion and a second side surface; and
   a bearing member positioned between said wedge member and said carriage and having a bearing member surface adjacent to said wedge member second surface, one of said wedge member first and second surfaces being beveled relative to the other.

2. The linear motion device of claim 1 wherein said body includes a rail embodying said body surface portion.

3. The linear motion device of claim 2 wherein said rail includes a wedge receiving recess and a bearing receiving recess.

4. The linear motion device of claim 3 wherein said wedge receiving recess includes said body surface portion.

5. The linear motion device of claim 4 wherein said body surface portion comprises a first wedge surface.

6. The linear motion device of claim 5 wherein one of said first and second surfaces of said wedge member comprises a second wedge surface.

7. The linear motion device of claim 6 wherein said first and second wedge surfaces are adjacent to and engage one another.

8. A linear motion device comprising:
   an elongated body having a longitudinal axis;
   a carriage moveable in a linear path relative to said body in a direction parallel to said longitudinal axis;
   an elongated wedge receiving recess in said body, said wedge receiving recess including a first wedge surface;
   an elongated bearing receiving recess in said body adjacent to said wedge receiving recess;
   at least one wedge member positioned in said wedge receiving recess, said wedge member including a second wedge surface adjacent to said first wedge surface;
   a bearing member positioned in said bearing receiving surface between said carriage and said wedge member and engaging said wedge member;

said wedge member being moveable in a first direction and said first and second wedge surfaces being oriented such that movement of said wedge member in said first direction causes corresponding movement of said wedge member and said bearing member in a second direction.

9. The linear motion device of claim 8 wherein said second direction is substantially perpendicular to said first direction.

10. The linear motion device of claim 8 including means for moving said wedge member in said first direction.

11. The linear motion device of claim 10 wherein said wedge member includes at least one threaded opening, said body includes at least one threaded member opening extending into said wedge receiving recess and said device further includes a threaded member extending through said threaded member opening and being received by said threaded opening.

12. The linear motion device of claim 11 including a plurality of said threaded members, said threaded openings and said threaded member openings.

13. The linear motion device of claim 8 wherein said body includes an elongated bore and a piston moveable therein.

14. The linear motion device of claim 8 wherein said carriage includes a central portion with a bearing assembly on opposing sides of said central portion.

15. The linear motion device of claim 8 including a pair of side rails with a portion of said carriage positioned therebetween.

16. The linear motion device of claim 8 wherein one of said side rails includes said wedge receiving recess and said bearing receiving recess.

17. A method of mounting a carriage for movement relative to an elongated body, said method comprising the steps of:

providing a body with a wedge receiving recess, a bearing receiving recess and a plurality of threaded member holes extending into said wedge receiving recess;

providing a wedge member with a plurality of threaded openings;

inserting said wedge member into said wedge receiving recess and retaining said wedge member therein by inserting a plurality of threaded members through said threaded member holes and into said threaded openings;

inserting a bearing member into said bearing receiving recess; and adjusting the position of said bearing member by rotation of said threaded members.

18. The method of claim 17 including providing a body with opposed side rails wherein one of said side rails includes said wedge and bearing receiving recesses.

19. The method of claim 18 including inserting a second bearing member into said other side rail and positioning a carriage between said bearing member and said second bearing member before said adjusting step.

20. The method of claim 18 including inserting a strain gauge between said bearing member and said other side rail before said adjusting step.

* * * * *

UNITED STATES PATENT AND TRADEMARK OFFICE
CERTIFICATE OF CORRECTION

PATENT NO. : 6,584,887 B1
DATED : July 1, 2003
INVENTOR(S) : Philip M. Poeschl

It is certified that error appears in the above-identified patent and that said Letters Patent is hereby corrected as shown below:

<u>Title page, Item [54] and Column 1, line 1,</u>
"LINEAR MOTOR DEVICE" should read -- LINEAR MOTION DEVICE --

Signed and Sealed this

Tenth Day of February, 2004

JON W. DUDAS
*Acting Director of the United States Patent and Trademark Office*